Figure 1:
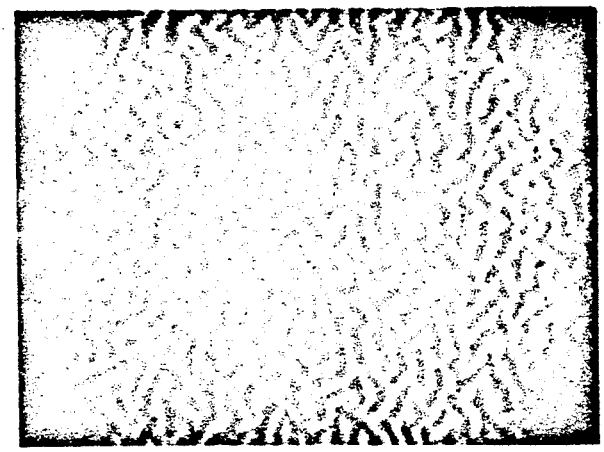

Oct. 27, 1964  D. B. FORREST ETAL  3,154,427

PROCESS FOR PRODUCING A MICROWRINKLED FINISH ON A SUBSTRATE

Filed June 14, 1961

INVENTORS.
D.B. FORREST
J. SMELKO

BY: *[signature]* AGENT.

United States Patent Office 3,154,427
Patented Oct. 27, 1964

BEST AVAILABLE COPY

3,154,427
PROCESS FOR PRODUCING A MICROWRINKLED FINISH ON A SUBSTRATE
David Balfour Forrest, Downsview, Ontario, and Joseph Frank Smelko, Cornwall, Ontario, Canada, assignors to Canadian Industries Limited, Montreal, Quebec, Canada, a corporation of Canada
Filed June 14, 1961, Ser. No. 117,492
3 Claims. (Cl. 117—41)

This invention relates to novel matt surface coatings and to a process for obtaining such coatings. More particularly, it relates to surface coatings the mattness of which is virtually independent of the pigment loading thereof.

Non-glossy finishes, otherwise known as matt or flat finishes, have certain uses both as protective and decorative surface coatings. The usual method of obtaining such finishes is to increase the pigment loading in coating compositions, i.e., the ratio of pigment to binder (P/B ratio). Thus while in a glossy, light coloured, pigmented finish, the P/B ratio ranges from about 50:100 to 100:100, in a flat finish the ratio is increased to about 160:100 and up to 500:100. At intermediate ratios come the so-called semi-gloss finishes. By "pigment" in this sense are meant prime pigments such as iron oxide, white pigments such as titanium dioxide and zinc oxide, and also the cheaper extenders such as calcium carbonate. By "binder" is meant the total film-forming material, excluding the pigments.

Certain disadvantages are met with the high P/B ratio necessary to make flat paints and baking enamels. In particular, as the P/B ratio rises, the surface coatings lose mar resistance. This is very noticeable on metal panels finished with high P/B flat coatings where running a blunt object lightly across the surface leaves a distinct mark. Furthermore, such matt coatings tend to polish to glossy finishes at places where they are rubbed, particularly if a little grease is present. Finally, matt finishes of high P/B compositions very readily collect dirt and are not easily cleaned.

The matt surface coatings of the present invention owe their lack of gloss to a different reason. The final surface is covered with very fine microwrinkles not visible to the naked eye, but readily seen under the microscope. The result is a particularly attractive finish which, on a sub-microscopic scale, can still have a glossy surface, although both in appearance and to the instruments of the trade, the surface is very matt. Being effectively a microwrinkled glossy coating, this finish has none of the disadvantages of previous flat finishes, is not easily marred, is resistant to polishing with wear and is readily cleaned if it collects dirt. The microwrinkled finish, being highly durable, is thus particularly suitable for exterior exposure such as on aluminum siding for homes.

It is thus an object of this invention to provide new non-glossy surface coatings. Another object is to provide matt surface coatings which are highly mar resistant, do not pick up dirt readily and are easily cleaned. A further object is to provide a process for making such coatings, and still further objects will appear hereinafter.

The new surface coatings of this invention consist of heat hardened films of resinous compositions, said compositions being adapted to become thermoset on heating with an acid catalyst and comprising essentially at least 2% by weight of a nitrogen resin, up to 98% by weight of at least one other film-forming resin, between 0.1% and 5%, by weight of the resin solids, of a secondary or tertiary amine salt of an acid catalyst, and preferably 1% to 10% by weight of a non-reactive thickener, said films being characterized by a microwrinkled surface having an 85° Gardner gloss of not more than 15. The other film-forming resin or resins are most suitably selected from the group consisting of alkyd resins, polyesters, polyepoxyesters and copolymers containing amide, alkylol N-substituted amide, carboxyl, hydroxyl or carboxylate groups. However, the essential property of such other resins is that they must crosslink with nitrogen resins when heated with an acid catalyst and so yield thermoset compositions, and the groups named as present in the aforesaid copolymers are those known to crosslink in this manner.

The Gardner gloss is a standard used throughout the industry and is measured on the Gardner Glossmeter made by Gardner Laboratories Inc., Bethesda, Maryland, U.S.A. The 85° gloss is measured at 85° to the perpendicular, and is thus suitably used for non-glossy surfaces. A lack of low angle gloss or sheen is particularly difficult to achieve by flatting methods known hitherto, and as far as is known has never before been achieved with the mar and soil resistance of the surface coatings of the present invention.

The process for making the surface coatings of this invention comprises, essentially, preparing the film-forming polymeric resins, blending said resins in a suitable solvent (which may be water) with a pigment (if desired) and preferably 1–10% by weight of a non-reactive thickener, adding between 0.1% and 5%, by weight of the resin solids, of a secondary or tertiary amine salt of an acid catalyst, applying the resulting coating composition onto an article to form a film at least 0.5 mil thick, and heat-hardening said film to form a hard infusible and solvent resistant film having a microwrinkled surface with an 85° Gardner gloss of not more than 15.

It is already known that coating compositions based on nitrogen resins and, for example, alkyd resins can be cross-linked by heat in the presence of an acid catalyst to give hard infusible coatings. Hitherto, however, such coatings have been glossy in the absence of pigment or with a P/B ratio of about 100:100 or less, and flat films have only been obtained at high P/B ratios with the disadvantages described hereinbefore.

It is also known that flat finishes can be given to alkyd nitrogen resin coating compositions by the use therein of catalysts comprising long chain mixed organic esters of phosphoric acid. However, the flatness of these finishes arises from a surface haze, possibly due to the incompatibility of the long chain groups, and in no way resembles the microwrinkled finishes of the present invention, nor approaches the latter in mattness, particularly in lack of low angle gloss measured on the 85° head.

In the accompanying drawing, the microwrinkled finishes of this invention are illustrated by photomicrographs, together with a known flat finish.

Figure 2:
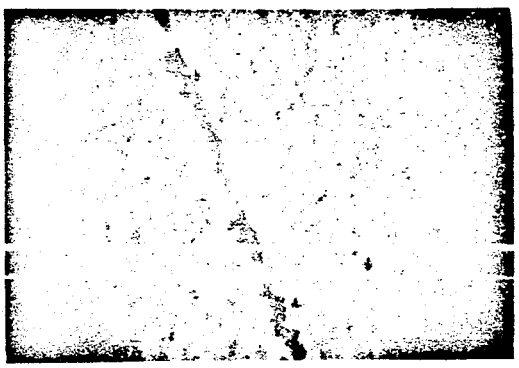

FIG. 1 shows a microwrinkled film which, in the absence of the microwrinkle, would be highly glossy;
FIG. 2 shows a conventional flat film; and
FIG. 3 shows a microwrinkled film obtained with the composition used to produce the film shown in FIG. 2 but having incorporated therein a secondary or tertiary amine salt of an acid catalyst.

FIG. 1 is a photomicrograph at 160 diameter enlargement of a film of 0.8 mil thickness obtained with the composition of Example 3 hereinafter. The microwrinkle can clearly be seen, and on the original, the submicroscopic glossy nature of the coating is also visible, yet the 85° gloss is only 2, and the 60° is 0. The P/B ratio is 100/100.

FIG. 2 is a photomicrograph at 80 diameter enlargement of a film of 0.8-1.0 mil obtained with the composition of Example 4 hereinafter, wherein the amine salt catalyst was not used. The catalyst, instead was the equivalent amount of p-toluene sulphonic acid. The 60° gloss is 3 but a pronounced low angle sheen is present. The film was readily marred by the well known wire test of which the mark can be seen.

Figure 3:
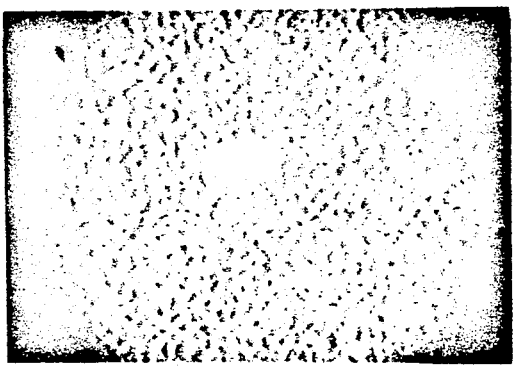

FIG. 3 is similar to FIG. 2 except that the triethylamine salt of the acid catalyst was used in the coating composition. The microwrinkle has reduced the low angle gloss (85°) to 9 and made the film much more mar resistant. The P/B ratio in both the films of FIGS. 2 and 3 was approximately 200/100, the pigment being equal quantities of TiO$_2$ and an extender, magnesium silicate.

The nitrogen resins which constitute essential ingredients of the compositions used in this invention are, for example, the formaldehyde condensation products of urea, melamine or benzoguanamine, and may be partially or wholly etherified with alcohols such as methyl and butyl alcohols. Such nitrogen resins are very well known in the coating art.

Other resins are also known which react with nitrogen resins or heating in the presence of an acid catalyst. Of particular interest in that they provide highly durable coatings are amide-containing copolymers prepared by copolymerizing vinyl or acrylic monomers with acrylamide or methacrylamide or their N-methylol derivatives. Suitable vinyl and acrylic monomers are styrene and the alkylated styrenes such as vinyl toluene and α-methyl styrene, acrylate esters such as ethyl, butyl and n-hexyl acrylates, methacrylate esters such as methyl, butyl and 2-ethyl-hexyl-methacrylates together with other copolymerizable species such as acrylonitrile. These species are copolymerized in solution with initiation by any known vinyl-type initiator of the peroxide (benzoyl peroxide) or azotype. In order that the amide-containing copolymer should best cross-link with a nitrogen resin, the most suitable amount of acrylamide or methacrylamide is between 3% and 15% by weight of the total copolymer.

In a similar manner, copolymers may be prepared which contain other groups that are known to cross-link (thermoset) with nitrogen resins on heating with an acid catalyst. Thus an α:β-ethylenically unsaturated carboxylic acid (acrylic, methacrylic, maleic, fumaric, crotonic, itaconic) may be included with the above monomers in a cross-linking amount, i.e., about 2% to 25% by weight. Alternatively, vinyl acetate copolymers may be cross-linked with a melamineformaldehyde resin, using the special amine salt catalysts described herein, and yield excellent microwrinkled films. Again, hydroxyl-containing copolymers may be prepared by copolymerization of monomers such as β-hydroxyethyl methacrylate, or by reacting acid-containing copolymers with olefinic oxides such as ethylene, propylene and butylene oxides. Hydroxyl-containing copolymers are very suitable for combination with nitrogen resins for obtaining the coatings of this invention.

For less expensive finishes, the resin used in addition to the nitrogen resin can be of the alkyd or polyester types. The former are well known materials which can be made by cooking together a multifunctional acid (e.g., phthalic anhydride), a multifunctional alcohol (e.g. glycerol) and an acid derived from a natural oil (e.g., soya oil, caster oil, coconut oil). For the present purpose the acid need not be a drying oil acid. The species named as examples are only illustrative and many equivalents are known in the art.

Polyesters are normally oil-free condensation polymers of a difunctional acid (e.g., adipic, fumaric, phthalic and succinic acids) and a polyfunctional alcohol (e.g., glycol, butylene glycol, hexane triol).

All these resins may be used in the process of this invention to cross-link the nitrogen resin and produce a matt microwrinkled film. However, the efficiency of the process depends in part upon the hardness of this film. A mixture of 90 parts of a copolymer of styrene/ethyl acrylate/acrylamide (30/63.75/6.25) and 10 parts of a urea-formaldehyde resin give an excellent flat finish when applied as a coating to a substrate and baked, after incorporation therein of 2½% of bentonite and, as catalyst, the toluenesulphonates of diisopropylamine, triethylamine, trimethylamine, tripropylamine or tributylamine. If a copolymer yielding a softer film, e.g., methyl methacrylate/2-ethylhexyl acrylate/acrylamide (35/58.75/6.25) was used, then the toluenesulphonates of a much wider range of amines would produce matt microwrinkled films, namely those of dimethylamine, diethylamine, diisopropylamine, di-n-propylamine, dibutylamine, trimethylamine, triethylamine, tri-n-propylamine, tributylamine, N-methyl butylamine, triisoamylamine, N,N-dimethyl ethanolamine, N,N-diethyl ethanolamine and N-methyl and N-ethyl morpholine. The softness of the film may be increased, and the formation of the microwrinkle encouraged, by modification of the composition. Thus, for example, the reduction of the proportion of nitrogen resin from about 30% to about 10% yields a softer, more easily microwrinkled film; so also does the blending of minor amounts of a plasticizer with the copolymer. Polyester and polyether plasticizers are suitable, the latter being, for example, polyethylene glycols of molecular weights between 500 and 1800.

When the surface coatings of this invention are prepared as clear coatings, i.e., with no pigment, it is necessary to adjust the softness and thickness of the applied films with some care, in order to achieve the required microwrinkled finishes. In such films, and in films whose pigment:binder ratio is such that in the prior art they would be considered glossy, the microwrinkled finishes are more reliably obtained when a small amount, about 1% to 10% by weight on resin solids, of a thickener is included in the coating compositions. Such thickeners include organic compounds of montmorillonite clay sold under the name of "Bentone," e.g., "Bentones 18, 27, 34 and 38," silica aerogels such as "Syloid 244" and "Santocel 54" wherein the silica is fibrous, about 25-35 A. diameter and spaced about 300 A. apart, and finely divided particulate silica such as "Cab-O-Sil" wherein the particle size is about 0.015-0.020 micron. Organic thickeners such as modified castor oils are also suitable, and indeed any thickener which promotes thixotropy in the coating compositions is believed to be suitable, provided it does not react with the catalyst. Such thickeners are called herein "non-reactive thickeners." By use of non-reactive thickeners, microwrinkled clear or low P/B ratio finishes may be reliably obtained on an industrial scale. It may be noticed that the use of this amount of thickener does not give an ultra flat coating in the absence of the microwrinkled surface. Although certain silica aerogels have been disclosed in the past as flatting agents, their action is of a different order to that of the present invention. Thus 5-6% of a really efficient aerogel can reduce the 60° gloss of a wood finish to 30-40, and this in the trade is called flat. However, the 85° (low angle) gloss remains at 70-80. The coatings of this invention have an 85° gloss of less than 15.

When a higher P/B ratio is used, it becomes possible to use as part of the pigment one of the known extender pigments. The use of such an extender pigment, for example with an equal quantity of TiO$_2$ pigment, renders the thickener unnecessary and it may be omitted. Such extender pigments include magnesium silicate ("Nytal 300, 400"), diatomaceous silicas ("Celite 281, 267, Super Floss"), aluminum silicates, calcium carbonate, finely divided mica, Cinquasia Violet and barium sulphate (German blanc fixe), and they should be present in an amount equal to at least 10% by weight of the resinous solids. To sum up, the microwrinkled flat finishes of this invention can be obtained in the absence of pigments, extenders or thickeners, but only with difficulty and by close control of composition and conditions. Thus when little or no pigment is used, a non-reactive thickener is preferred; when the P/B ratio reaches 100 or more, the thickener may be omitted and an extender pigment used as part of the pigment loading to encourage reliable production of the microwrinkle.

In order to obtain a microwrinkled matt finish, it is necessary that the coating composition be applied as a reasonably thick film. In general, it has not proved possible to produce a finish of good appearance with a film thickness less than 0.5 mil and a thickness of 0.8 mil or more should preferably be used. The maximum film thickness is governed only by ease of application.

Toluenesulphonic acid has been mentioned hereinbefore as a suitable acid whose secondary or tertiary amine salt is an effective catalyst for producing the microwrinkled flat finishes of this invention. It is believed that any acidic material which will catalyse the curing or heat-hardening reaction is suitable in its amine salt form, but particularly suitable are benzene sulphonic acid, sulphuric acid, phosphoric acid, borontrifluoride, ammonium dihydrogen phosphate and dimethyl acid pyrophosphate. It has been stated hereinbefore that the catalyst is suitably present in an amount between 0.1% and 5.0% by weight of the resin solids.

The surface coatings of this invention are remarkable in that their lack of gloss is virtually independent of the pigment loading used. As described hereinbefore, they may be used with no pigment, as clear coatings, and when applied over a coloured undercoat or enamel, such clears give a particularly attractive opaque finish. Light coloured coatings made from compositions having a P/B ratio of between 50 and 100:100 are very flat when made according to the process of this invention, whereas similar coatings using an acid catalyst in place of the amine salt catalyst are highly glossy. When the P/B ratio rises as far as 200:100 or more, the microwrinkle in the surface coatings of this invention does not stand out so clearly under the microscope; it may still be detected, however, because microwrinkled flats possess a resistance to marring far superior to ordinary flats made from similar compositions using an acid catalyst in place of the amine salt catalyst of this invention. Even under the microscope, considerable regularity can still be detected in the roughness of the microwrinkled highly pigmented surface, as in FIG. 3.

The following examples, wherein parts are by weight unless otherwise stated, illustrate the surface coatings of this invention, but in no manner restrict the scope thereof.

*Example 1*

This example illustrates the production of a microwrinkled flat finish in the absence of any thickener or extended pigment.

A copolymer of methyl methacrylate (30 parts), butyl acrylate (63.75 parts) and acrylamide (6.25 parts) was prepared by mixing these monomers with 15 parts of n-propanol and 1.5 parts of benzoyl peroxide and adding the mixture during 2 hours to boiling xylene (85 parts). When addition was complete the solution was stirred under reflux for three hours, and cooled. Essentially 100% conversion took place to give a 50% solids solution of copolymer of viscosity V on the Gardner-Holdt scale.

A resinous polyester was prepared as follows: a mixture of 1,3-butylene glycol (34.52 parts), adipic acid (40.30 parts), phthalic anhydride (13.63 parts) and toluene (0.97 part) was stirred and heated to 200° C. in a vessel fitted with a Dean-Stark water separator until the acid value dropped to 67 mg. potassium hydroxide/gm. resin. To this mixture was added 1,3-butylene glycol (8.63 parts) and toluene (1.95 parts) and the reaction continued at 200° C. to 230° C. until the acid value dropped to 5. The resultant polyester had a viscosity $Z_1-Z_2$ and 97% total solids.

A mill base was prepared by grinding 45–60 parts rutile titanium dioxide with 19.10 parts of the above copolymer (solids basis), and this base was mixed with 18.2 parts of a butylated urea-formaldehyde resin of high mineral spirits tolerance ("Uformite" F240), 6.83 parts of the polyester and 2.28 parts of a 15% butanol solution of the triethylamine salt of p-toluene sulphonic acid. This coating composition was diluted to spray viscosity with xylene, and sprayed on metal panels. After baking at 125° C. for 35 minutes, a microwrinkled film of smooth matt appearance was formed. Its 85° gloss was 5 on the Gardner meter.

*Example 2*

A mixture of methyl methacrylate (50 parts), ethylacrylate (32.75 parts), butyl acrylate (11.0 parts) and acrylamide (6.25 parts) was copolymerized in the manner shown in Example 1.

A dispersion of "Bentone" 34 in xylene was prepared by vigorously stirring 2.44 parts of "Bentone" in 21.96 parts xylene.

A coating composition was prepared from the following ingredients:

| | Parts |
|---|---|
| Copolymer | 33.75 |
| Butylated U.F. resin | 28.15 |
| Polyester (Example 1) | 3.86 |
| "Bentone" dispersion | 24.40 |
| Triethylamine salt of p-toluene sulphonic acid (15% sol.) | 1.13 |
| Xylene | 8.71 |

This composition was sprayed onto steel panels and onto coloured enamelled panels, and after baking at 125° C. for 30 minutes gave a beautiful frosted appearance of high mar resistance and 85° gloss about 4.

When a small amount, about 5%, of carbon black was carefully dispersed in the composition, the baked coating had a superior low sheen matt black microwrinkled finish.

*Example 3*

This example illustrating a low pigment white coating wherein the microwrinkle is reliably produced by using an inorganic thickener.

A copolymer of methyl methacrylate/ethyl acrylate/acrylamide in the ratio 50/43.75/6.25 was prepared by the method of Example 1. This was made into a coating composition of the following composition.

| | Parts |
|---|---|
| $TiO_2$ pigment | 2820 |
| "Bentone" 34 as 12% soln. | 1690 |
| Copolymer | 1470 |
| Polyester | 564 |
| Butylated U.F. Resin (60% soln.) | 1320 |
| Triethylamine salt of p-toluene sulphonic acid (10% soln.) | 141 |

Thus, the pigment/thickener/binder ratio was 100/7.2/100. This composition was applied to steel panels and baked at 350° F. for 10 minutes or 450° F. for 1½ minutes to yield a microwrinkle film of 0 gloss on a 60° Gardner head, and 2 on an 85° head.

A precisely similar coating using p-toluene sulphonic acid or a primary amine salt thereof gave a gloss reading of 55–60 on a 60° head, and 85–90 on an 85° head.

When the catalyst was replaced by the triethylamine salt of phosphoric acid a fine microwrinkled coating was again obtained.

Example 4

A high pigment microwrinkled flat finish was prepared in the same manner as in Example 3. The same resins were used in the same ratio (50/30/20, copolymer/U.F./polyester), and the pigment and binder composition was:

| | Parts |
|---|---|
| Rutile TiO$_2$ | 23.0 |
| "Nytal" 400 magnesium silicate | 26.3 |
| Copolymer | 11.5 |
| U.F. | 6.9 |
| Polyester | 4.5 | giving a P/B ratio of 215:100. The catalyst used was the triethylamine salt of p-toluene sulphonic acid, and after roller coating aluminum siding at a film thickness (dry) of 0.8–1.0 mil, the film was baked for 1 minute at 425° F. Gloss readings were 4 on a 60° head and 9 on an 85° head. A pronounced microwrinkle was the cause of this desirable low angle mattness.

Example 5

An enamel was prepared from a glycerol/phthalic anhydride/coconut oil fatty acid alkyd resin (3.7/3.9/3.0) and a butylated urea-formaldehyde resin ("Uformite" F240) in the solids ratio of 1.0:1.5. The catalyst, triethylamine p-toluene sulphonate, was added at a level of 1% by weight of acid on vehicle solids, and the coating reduced with butanol and sprayed on steel panels. After baking at 300° F. for 10 minutes, a fine frosted film with a pronounced microwrinkle was produced, giving a very low gloss and excellent mar resistance.

Example 6

A coating system similar to those of earlier examples was prepared using the copolymer of Example 2, together with a butylated U.F. resin and a butylene glycol/adipic acid polyester, in the proportion 63.5/27.2/9.3. It was pigmented with 50 parts of rutile TiO$_2$ and 6 parts of "Bentone" 34 per 100 parts of resin. A series of p-toluene sulphonic acid catalysts was made up, neutralized by mixtures of triethylamine and a primary amine, and containing increasing proportions of triethylamine. The catalysed compositions were sprayed and baked in the usual manner. It was found that at between 40% and 42% neutralization by triethylamine (i.e., 60–58% primary amine), the microwrinkle appeared and the 85° gloss fell from 98 to 15. This was considered a good matt finish. At higher levels of triethylamine, the gloss fell more slowly to about 2. It was thus apparent that the appearance of the microwrinkle was very specific to the tertiary (or secondary) amine salt, and that the inorganic thickener alone did not product mattness. The precise amount of neutralization necessary varied with the P/B ratio, and in general there is no disadvantage in using the neutral salt.

Example 7

In series of coatings similar to those of Example 5, the following resin mixtures were shown to produce the required microwrinkled surfaces when triethylamine p-toluene sulphonate was used as a catalyst.

| Resins | Proportions, parts |
|---|---|
| (i) 65% solution of a modified butylated melamine-formaldehyde resin | 40 |
| Coconut oil alkyd, oil length 31% (Trimethyl ethane, 5.5/glycerol, 1.0/phthalic anhydride, 4.9/adipic acid, 1.2/soya oil, 3.0) | 60 |
| (ii) 65% solution of the same melamine-formaldehyde resin | 40 |
| 50% solution of an epoxy ester of "Epon" 1004/dehydrated castor oil, 60/40 | 60 |
| (iii) Long cycle—all acid process urea-formaldehyde resin | 25 |
| Soya oil alkyd, oil length 66.3% (Soya oil, 0.6/pentaerythritol, 2.0/phthalic anhydride, 0.4/monobodied soya oil, 2.3) | 75 |

Example 8

Two clear vehicles were made up, one having a copolymer of methyl methacrylate/ethyl acrylate/butyl acrylate/acrylamide, 50/32.75/11.0/6.25, the other a copolymer of methyl methacrylate/acrylamide 93.75/6.25. Both also contained varying amounts of a butylated urea-formaldehyde resin and 0.5% of triethylamine p-toluene sulphonate as catalyst. It was found that good microwrinkled films could be produced when the proportion of U.F. resin was from 2% up to 100%, although coatings having a very high U.F. content are usually rather brittle. Similar results were achieved with a melamine-formaldehyde resin and a methylated urea-formaldehyde resin. Thus the minimum quantity of nitrogen resin is about 2%.

While nearly all the coatings described in the examples used triethylamine p-toluene sulphonate as a catalyst, equally satisfactory coatings were prepared with a much wider range of secondary and tertiary amine salts of acid catalysts, as has been disclosed hereinbefore

Example 9

An interpolymer was prepared from styrene/methyl methacrylate/ethyl acrylate/acrylic acid/acrylamide in the ratio 22.05/9.04/53.55/4/11 by the following method.

The following mixture was run into 1250 g. of refluxing isopropanol over 1½ hours:

| | G. |
|---|---|
| Styrene | 606.4 |
| Methyl methacrylate | 258.4 |
| Ethyl acrylate | 1472.6 |
| Acrylic acid | 110.0 |
| Acrylamide | 302.6 |
| Benzoyl peroxide | 55.0 |
| Isopropanol | 1000.0 |

The acrylamide was first dissolved in the isopropanol and the small amount of insoluble residue filtered off. The isopropanol solution was then added to the remaining constituents. After addition of the mixture to the refluxing isopropanol, polymerization became very vigorous and the vessel had to be cooled. After 1 hour, further heating was required to sustain refluxing, and this condition was continued for 5 hours. The result was an interpolymer solution of 53.9% total solids.

From a 250 g. sample were distilled 78.2 g. of the solvent, and subsequently 3.7 g. of trimethylamine (as a 20% aqueous sol.) were added, and stirred for 20 minutes. 23 g. of a butylated urea-formaldehyde coating resin were added, and stirred for 10 minutes. 206 g. of hot water were run in over one hour under moderate stirring, and a fine stable emulsion of about 1 micron particle size was formed.

100 g. of this emulsion were pigmented by grinding with 119.4 g. of TiO$_2$ and 20 cc. of water, and then a coating composiiton was formed from 180 g. of pigmented emulsion and 376 g. of clear emulsion plus water to a viscosity of 75 centipoises. This composition was catalysed with 1% on resin solids of trimethylamine p-toluene sulphonate, sprayed onto phosphated steel, air dried for 60 minutes, and baked for 30 minutes at 150° C. A hard, solvent resistant film having a 60° Gardner gloss of 6 resulted. When ammonia was used in place of trimethylamine, a highly glossy film resulted (gloss 89).

What we claim is:

1. A process for producing on a substrate a microwrinkled finish the 85° Gardner gloss of which does not exceed 15, which comprises applying to said substrate in the form of a coating at least 0.5 mil thick a coating composition formed from (1) from 2% to 98% by weight of a thermosetting aminoplast resin, (2) from 98% to 2% by weight of at least one resin selected from the group consisting of copolymers of ethylenically unsaturated compounds containing free amido groups, polyesters, poly (epoxyesters) and oil-modified alkyd resins, and (3) from 0.1% to 5.0%, based on the combined weights of the said resins, of a heat-curing acid catalyst for said aminoplast resin, said catalyst being in the form of a salt selected from the group consisting of secondary and tertiary amine salts, and heating the coated substrate to cure said coating composition.

2. The process of claim 1 wherein the coating composition contains from 1% to 10%, based on the combined weight of the resins, of a thickening agent which is non-reactive with the heat-curing acid catalyst.

3. The process of claim 1 wherein the coating composition contains pigmenting material in a pigment:resin weight ratio of at least 1:1, the said pigmenting material including at least one extender pigment in an extender pigment:resin weight ratio of at least 0.1:1.

References Cited in the file of this patent

UNITED STATES PATENTS

| | | |
|---|---|---|
| 1,877,130 | Hill et al. | Sept. 13, 1932 |
| 1,893,611 | Bradley | Jan. 10, 1933 |
| 2,410,395 | Smidth | Oct. 29, 1946 |
| 2,640,037 | Parry et al. | May 26, 1953 |
| 2,687,397 | Dannenberg | Aug. 24, 1954 |
| 2,703,765 | Osdal | Mar. 8, 1955 |
| 2,718,476 | Eichorn | Sept. 20, 1955 |
| 2,864,805 | Cooke | Dec. 16, 1958 |
| 2,978,433 | Hurwitz | Apr. 4, 1961 |

OTHER REFERENCES

Protective Coating for Metals, Burns et al. (1939), pp. 293 to 296 pertinent.